US012768339B1

(12) United States Patent
Oh et al.

(10) Patent No.: US 12,768,339 B1
(45) Date of Patent: Oct. 20, 2026

(54) ADDITIVELY MANUFACTURED, AZIMUTHAL GAS DIFFUSER FOR HALL THRUSTERS

(71) Applicant: The Regents of the University of Michigan, Ann Arbor, MI (US)

(72) Inventors: Braden Oh, La Canada, CA (US); Mahderekal Getachew Regassa, Wellesley, MA (US); Avery Clowes, Bolton, MA (US); Grant Everett Miner, Fremont, CA (US); Albert Countryman, Oakland, CA (US); Nathan Cantrell, Dracut, MA (US); Lucas Buchanan Ewing, Brighton, MA (US); Christopher Lee, Needham, MA (US)

(73) Assignee: The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 18/196,017

(22) Filed: May 11, 2023

Related U.S. Application Data

(60) Provisional application No. 63/340,566, filed on May 11, 2022.

(51) Int. Cl.
*F03H 1/00* (2006.01)

(52) U.S. Cl.
CPC .................................. *F03H 1/0037* (2013.01)

(58) Field of Classification Search
CPC .... F03H 1/0037; F03H 1/0075; F03H 1/0012; F02K 9/52; B64G 1/405; B64G 1/402
See application file for complete search history.

(56) References Cited

U.S. PATENT DOCUMENTS

| | | | | |
|---|---|---|---|---|
| 5,646,476 A * | 7/1997 | Aston | H01J 27/143 313/363.1 |
| 5,973,447 A * | 10/1999 | Mahoney | H01J 27/143 313/363.1 |
| 6,322,729 B2 | 11/2001 | Rexford et al. | |
| 9,089,040 B2 | 7/2015 | Ozaki et al. | |

(Continued)

FOREIGN PATENT DOCUMENTS

EP 1995458 B1 1/2013

OTHER PUBLICATIONS

Screen captures from YouTube video clip entitled "Olin College Hall Thruster Test Fire," 4 pages, uploaded on Dec. 20, 2018 by user "Braden Oh". Retrieved from Internet: <https://www.youtube.com/watch?app=desktop&v=DPC2WJL_qrM>. pp. 1-3 show still frame side views of a Hall thruster during a test fire, and p. 4 shows still frame end views of the Hall thruster during the test fire.

(Continued)

*Primary Examiner* — Andrew H Nguyen
(74) *Attorney, Agent, or Firm* — Reising Ethington P.C.

(57) ABSTRACT

A diffuser for a Hall effect thruster system includes helical channels and is configured to eject ionizable propellant into an annular thruster channel of the thruster system. The propellant is ejected into the annular channel in directions tangent to the each helical channel. The helical channels partly define a hollow internal flow geometry extending between inlet and outlet ends of a solid diffuser body. Corresponding systems, methods of making, and methods of using the diffuser also are disclosed.

19 Claims, 9 Drawing Sheets

(56) References Cited

U.S. PATENT DOCUMENTS

| | | | | |
|---|---|---|---|---|
| 9,334,855 | B1 | 5/2016 | Hruby et al. | |
| 10,273,944 | B1 | 4/2019 | Huang et al. | |
| 11,346,330 | B1 * | 5/2022 | Xu | F03H 1/0075 |
| 2002/0041041 | A1 | 4/2002 | Johnson | |
| 2009/0293482 | A1 * | 12/2009 | Davis, Jr. | F23R 3/343<br>60/737 |
| 2012/0311992 | A1 * | 12/2012 | Ozaki | F03H 1/0037<br>60/202 |
| 2015/0128560 | A1 | 5/2015 | Conversano et al. | |
| 2017/0248318 | A1 * | 8/2017 | Kulkarni | F23R 3/46 |
| 2017/0363294 | A1 * | 12/2017 | Grooms | F02C 7/222 |
| 2021/0148573 | A1 * | 5/2021 | Jain | F23R 3/002 |
| 2022/0341595 | A1 * | 10/2022 | Kamoi | F23D 11/103 |

OTHER PUBLICATIONS

Oh et al., "Undergraduate Demonstration of a Hall Effect Thruster: Self Directed Learning in an Advanced Project Context," Student Paper, 127th ASEE Annual Conference, Jun. 22, 2020, 21 pages, American Society for Engineering Education, published on-line.

Xia et al., "Effects of rotating supply mode on the ionization parameters of a krypton Hall thruster," Vacuum, Aug. 1, 2020, pp. 1-10, vol. 181, Elsevier Ltd., published on-line.

Xia et al., "Performance optimization of a krypton Hall thruster with a rotating propellant supply," Acta Astronautica, Mar. 18, 2020, pp. 290-299, vol. 171, Elsevier Ltd., published on-line.

Baird, et al., "Designing an Accessible Hall Effect Thruster," Honors Theses, 2697, Apr. 19, 2016, 66 pages, ScholarWorks@WMU, published on-line.

Hopping et al., "Small Hall Effect Thruster with 3D Printed Discharge Channel: Design and Thrust Measurements," Aerospace, Aug. 15, 2021, p. 227 (14 pages), vol. 8, MDPI (Basel, Switzerland), published on-line.

Hopping et al., "Design and Testing of a Hall Effect Thruster with 3D Printed Channel and Propellant Distributor," IEPC-2017-119 presented at 35th International Electric Propulsion Conference, Oct. 8, 2017, 9 pages, IEPC, Atlanta, GA, USA.

Bretti "Progress and Developments of Ultra-Compact 10 Watt Class Adamantane Fueled Hall Thrusters for Picosatellites," IEPC-2022-349 presented at 37th International Electric Propulsion Conference, Jun. 19, 2022, 25 pages, Electric Rocket Propulsion Society, published on-line.

Zhang Xu, et al., Effect of azimuthal diversion rail on an ATON-type Hall thruster, J. Phys. D: Appl. Phys., 2017, pp. 1-8.

Liang Han, et al., Mode transition induced by the magnetic field gradient in Hall thrusters, J. Phys. D: Appl. Phys., 2016, pp. 1-7.

Oh et al., "Design, fabrication, and testing of an undergraduate hall effect thruster," J. Electr. Propuls., Feb. 7, 2023, vol. 2, Art. 6, 22 pages, Springer Nature, published on-line.

Satpathy et al., "Propellant Utilization Efficiency of an Argon Hall thruster with Swirl Injection," International Electric Propulsion Conference, Jun. 23-28, 2024, 16 pages, IEPC-2024-376, Electric Rocket Propulsion Society, presented in Toulouse, France.

Oh et al., "Feasibility of All-Electric Three Axis Momentum Management for Deep Space Small Body Rendezvous," AIAA Propulsion and Energy Forum, 50th AIAA/ASME/SAE/ASEE Joint Propulsion Conference, Jul. 28-30, 2014, 14 pages(s), American Institute of Aeronautics and Astronautics, Inc., presented in Cleveland, OH, USA.

Ashkenazy, et al. "Torque Control of Hall Propelled Small Spacecraft," 26th International Electric Propulsion Conference, conference paper IEPC-99-183, Oct. 1999, 6 pages, Japan Society for Aeronautical and Space Sciences, presented at Kitakyushu, Japan.

* cited by examiner

ADDITIVELY MANUFACTURED, AZIMUTHAL GAS DIFFUSER FOR HALL THRUSTERS

RELATED APPLICATIONS

This application claims the benefit of U.S. Provisional Patent Application No. 63/340,566 filed May 11, 2022, the contents of which are incorporated by reference herein in their entirety.

BACKGROUND

Electric space propulsion engines are a class of propulsion engines that generate thrust by forming and ejecting ions at high velocities. Ions are often created by removing electrons from an otherwise electrically neutral propellant. Hall effect thrusters are a class of electric space propulsion engines that use electron bombardment as the mechanism for propellant ionization. Hall thrusters inject propellant into an annular channel within which propellant ionization and ion acceleration occurs. This propellant is often injected with the aid of a diffuser that serves to spread the propellant throughout the channel. The trajectory of the propellant as it exits the diffuser is significant because it influences how long the propellant ultimately remains inside the channel; increasing propellant lingering time (longevity) inside the channel increases the probability of ionization, which in turn increases thruster efficiency. Axial emission, which is a common injection method used in contemporary Hall thrusters, results in shorter longevity inside the thruster channel and thereby a lower thruster efficiency. For this reason, developing Hall thruster propellant diffusers that reduce axial velocity is advantageous.

SUMMARY

One embodiment described herein is a diffuser comprising an annular component configured to eject propellant into an annular cavity with tangential velocity, the annular component having a first surface containing at least one inlet opening and a second surface containing a plurality of outlet openings, both surfaces being constrained by generally ring-shaped inner and outer walls. The annular component contains an interior wall forming a toroidal plenum connected to the inlet openings, an interior helical wall forming a first helical channel extending from the toroidal plenum to the first outlet opening on the second surface, and a second interior helical wall forming a second helical channel extending from the toroidal channel to the second outlet openings on the second surface. In embodiments, the diffuser is a unitary component. In some cases, the diffuser contains 1-4 inlet openings and 2-90 outlet openings.

Another embodiment is a Hall effect thruster system including a diffuser comprising an annular component configured to eject propellant into an annular cavity with tangential velocity, the annular component having a first surface containing at least one inlet opening and a second surface containing a plurality of outlet openings, both surfaces being constrained by generally ring-shaped inner and outer walls. The annular component contains an interior wall forming a toroidal plenum connected to the inlet openings, an interior helical wall forming a first helical channel extending from the toroidal plenum to the first outlet opening on the second surface, and a second interior helical wall forming a second helical channel extending from the toroidal plenum to the second outlet openings on the second surface. In embodiments, the system comprises an electric propulsion engine. In embodiments, the system is configured to generate a plasma. In embodiments, the system includes multiple concentric diffusers. In embodiments, all of the diffusers have helical channels. In some cases, the system is configured to carry a gaseous propellant. In some cases, the system is configured to carry a liquid propellant.

Another embodiment described herein is a method of making a diffuser using additive manufacturing. In embodiments the additive manufacturing is stereolithography or sintering. In some cases the sintering is selective laser sintering or direct metal laser sintering.

A further embodiment disclosed is a method comprising obtaining a Hall effect thruster including a diffuser comprising an annular component configured to eject propellant into an annular cavity with tangential velocity, the annular component having a first surface containing at least one inlet opening and a second surface containing a plurality of outlet openings, both surfaces being constrained by generally ring-shaped inner and outer walls. The annular component contains an interior wall forming a toroidal plenum connected to the inlet openings, an interior helical wall forming a first helical channel extending from the toroidal plenum to the first outlet opening on the second surface, and a second interior helical wall forming a second helical channel extending from the toroidal plenum to the second outlet openings on the second surface. The method further includes using an electron source to ignite the thruster by creating an initial plasma and supplying electrons to ionize propellant passing through the diffuser. In most cases, the electron source is external. In embodiments, the Hall effect thruster is used to propel a spacecraft.

DETAILED DESCRIPTION

Embodiments of the invention include a mechanical diffuser which accepts a number of incoming propellant streams, divides these streams among a plurality of flows, and directs these flows to have an azimuthal trajectory upon being injected into the annular cavity (channel) of a Hall effect thruster within which propellant ionization and ion acceleration occurs. The plurality of flows serves to dispense the propellant evenly throughout the Hall thruster channel while the azimuthal trajectory increases propellant longevity in the thruster channel, increasing the probability of propellant ionization. In embodiments, this diffuser is a single, unitary component manufactured additively and has no moving components, reducing the likelihood of suboptimal or failed operation.

This propellant is injected with the aid of the diffuser that serves to spread the propellant throughout the Hall thruster channel. The trajectory of the propellant as it exits the diffuser is important because it determines how long the propellant ultimately remains inside the thruster channel; longer propellant lingering time (longevity) inside the thruster channel increases the probability of ionization. Axial emission results in short longevity, hence azimuthal or radial injection of propellant (to increase longevity) is advantageous.

Figure 1:
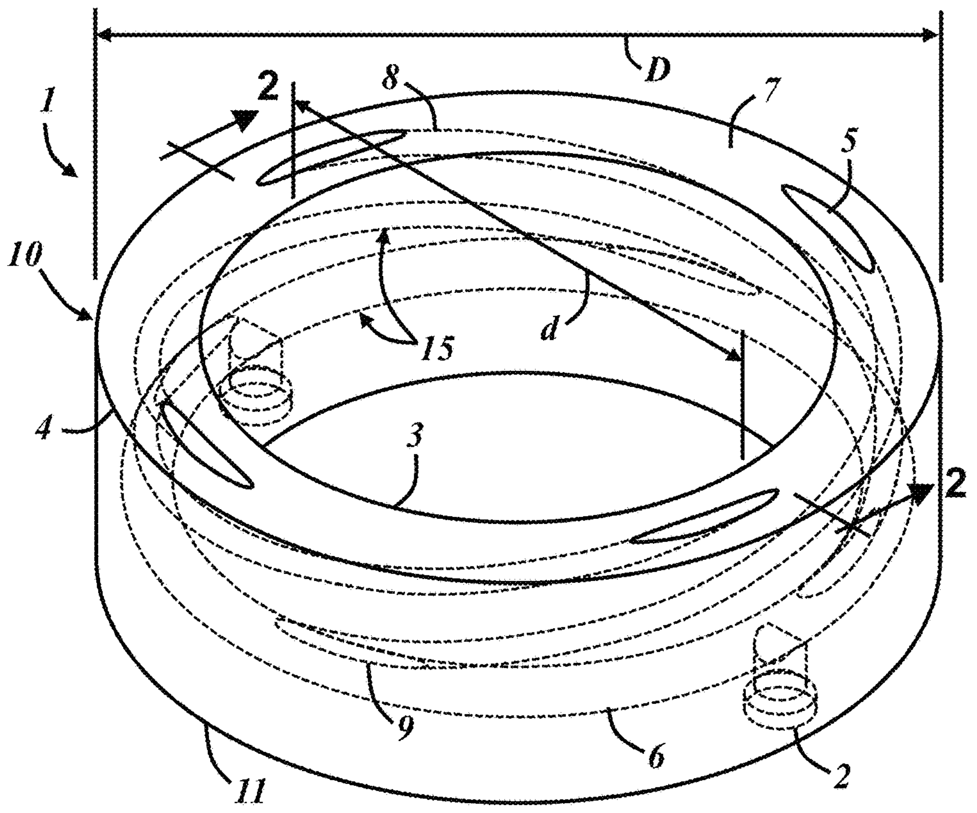
FIG. 1 is an isometric view of a first embodiment.
Figure 9:
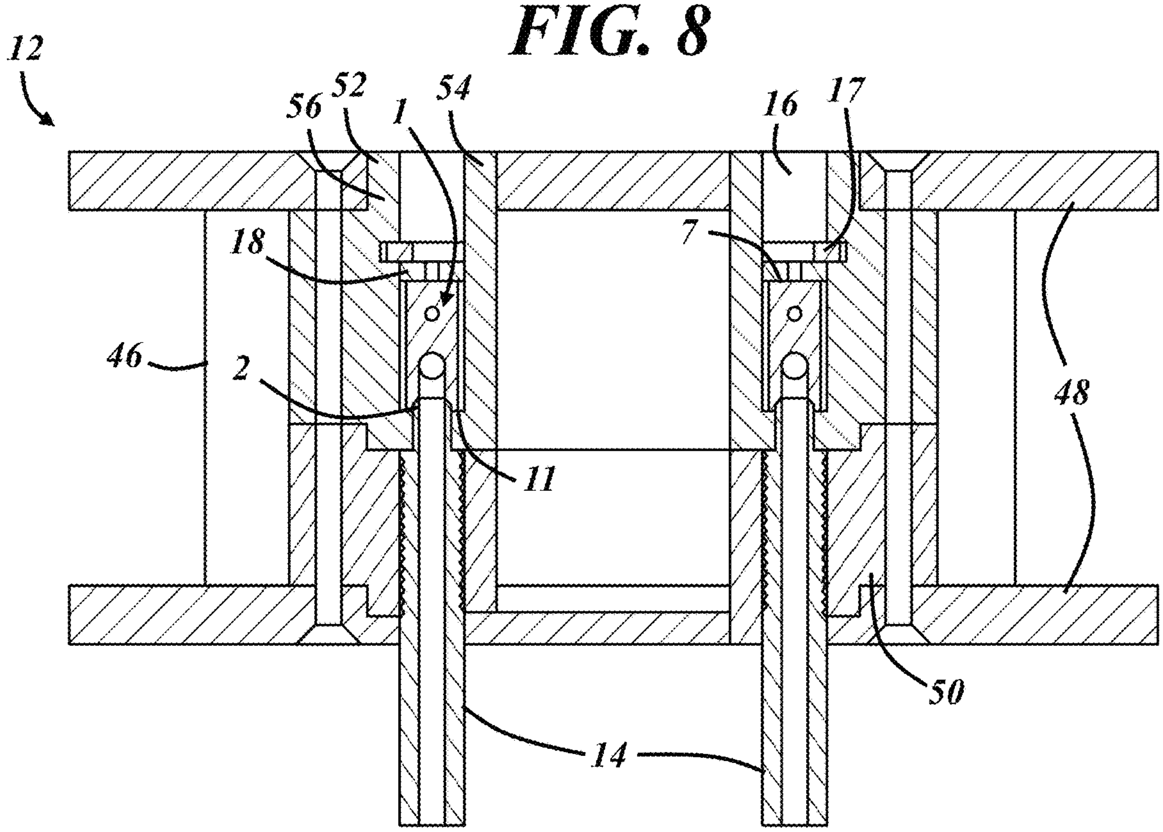
FIG. 9 is a sectional side view of the Hall effect thruster system containing the first embodiment.

FIG. 1 depicts an isometric view of a first embodiment of an azimuthal propellant diffuser 1. In the first embodiment, the diffuser 1 is ring-shaped and includes a solid diffuser body 10-*a* rectangular toroid in this example—and a hollow internal flow geometry 15 formed within the solid diffuser body 10. A radially inner wall 3 of the ring is constrained at the internal or inner diameter d of the diffuser body 10. A radially outer wall 4 of the ring is constrained by the outer wall diameter D. Inlet holes 2 at an inlet end 11 of the diffuser body 10 are configured to connect to external propellant feed tubes 14, as shown in FIG. 9. Propellant flows from the external gas and/or liquid feed tubes 14 into the inlet holes 2, which ultimately connect to helical tubes 8 inside the diffuser body 10 as part of the hollow internal gas flow geometry 15 of the diffuser 1. Outlet ends 5 of the internal helical tubes 8 define a plurality of azimuthally spaced outlet holes at an outlet end 7 of the diffuser body 10, opposite the inlet end 11 of the diffuser body.

When used as part of a Hall thruster system which incorporates center-mounted hardware, such as a hollow cathode or central magnetic poles, it may be advantageous to make the size of the hole through the center of the annular diffuser as large as possible. In this case, the diameter d of the hole through the center of the diffuser could be about 50-95% of the outer diameter D of the diffuser, or about 70-95%, or about 85-95%. Conversely, when used as a temperature managing component within a Hall thruster system it may be advantageous to make the size of the hole through the center of the annular diffuser as small as possible or remove the central hole entirely and use a set of smaller holes to accommodate specific hardware, such as bolts or magnetic poles. In this case, the diameter d of the hole through the center of the diffuser could be 0 to about 50% of the outer diameter D of the diffuser, or about 3-25%, or about 5-10%.

Figure 2:
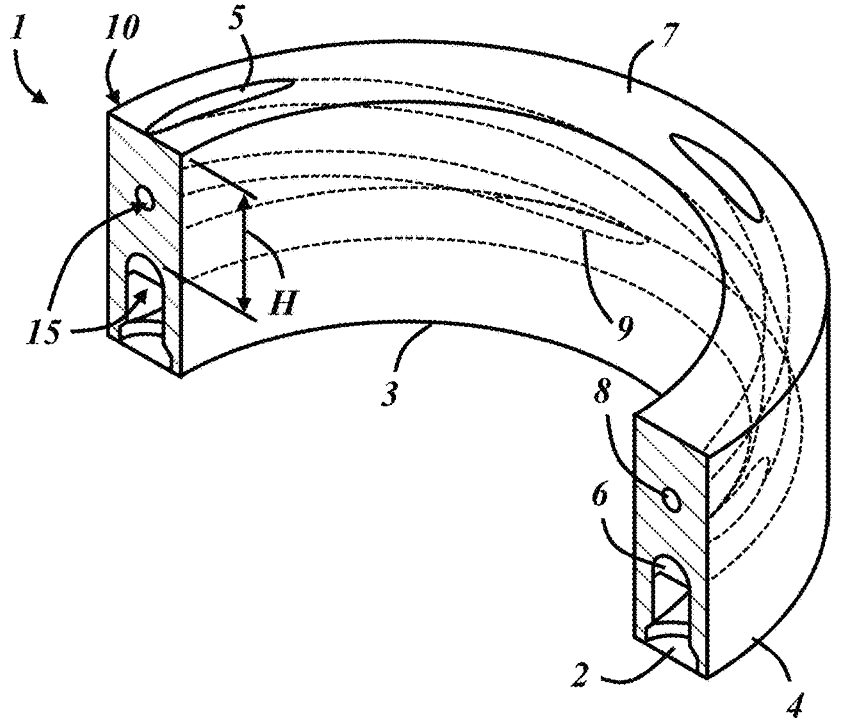
FIG. 2 is a sectional isometric view of the first embodiment.

FIG. 2 depicts the same isometric view of the first embodiment as shown in FIG. 1, but with a diametrically visible cross section. The location of the cross section highlights the plurality of propellant inlet holes or interfaces 2, of which the first embodiment contains two that are diametrically opposite from each other. In the first embodiment these interfaces 2 accept propellant from propellant feed tubes 14 (FIG. 9) through a pipe insertion sealed by an adhesive, though additional embodiments may feature different interfaces, including but not limited to screw threads. In the first embodiment these interfaces are centered between the inner and outer walls 3, 4 of the diffuser 1. These inlet interfaces 2 guide propellant into a plenum 6 formed within the solid diffuser body 10 as part of the hollow internal gas flow geometry 15. In the first embodiment, the plenum 6 is a toroidal cavity of uniform diameter and circles around the entire circumference of the diffuser 1. The radially inner and outer extents of the toroidal cavity or plenum 6 are enclosed by the inner and outer walls 3, 4 of the diffuser, respectively. Propellant flows into the plenum 6 through the inlet interfaces 2 and flows azimuthally to fill the interior of the plenum 6. On the upper portion of the plenum 6 (as oriented in FIG. 1), the plenum 6 opens into a plurality of helical tubes 8 that are each shaped like a portion of a helix, each of which has an inlet end 9 at the plenum 6 and an outlet end 5 opening on the outlet end 7 of the diffuser body 10—i.e. the upper surface (as oriented in FIG. 1) of the diffuser 1. These inlet openings 9 are azimuthally spaced and have a shape driven by the intersection between the helical tubes 8 and the toroidal plenum 6 to allow propellant to flow from the plenum 6 into the helical tubes 8. The helical tubes 8 coil upward to the outlet end 7 of the diffuser body 10, maintaining both a constant internal radii and radial distance from the center of the diffuser 1 in the first embodiment. The helical tubes 8 are visible in FIG. 2 as two small circular holes in the cross-sectional face. These tubes 8 are constrained by the bulk material of the diffuser body 10, which bulk material fully encloses the tubes and extends outwardly to the outer wall 4 and inwardly to the inner wall 3 of the diffuser 1. The shapes of the openings that the outlet ends 5 of helical tubes 8 make on the top face of the diffuser are driven by the intersection between the helical tubes 8 and the radially extending plane of at the outlet end 7 the diffuser 1. These openings 5 serve as outlets that allow the propellant to exit the diffuser with a largely azimuthal trajectory. The inner helical geometry may be optimized to maximize the azimuthal flow of the propellant and thereby increase longevity of the propellant inside the channel 16 of a Hall thruster when the diffuser 1 is incorporated into a larger Hall thruster system 12 (which is depicted in detail in FIGS. 8 and 9). More specifically, the pitch of the helical tubes 8 may be configured to be as low as reasonably possible so as to minimize the axial velocity of propellant particles (and thereby maximize the azimuthal velocity). This may be done by revolving the helical tubes through 0-100% or about 1-85% or about 2-75% of the 360 degrees of the diffuser. The embodiment shown in FIGS. 1 and 2 uses a helical revolution of 50% (i.e., the angular spacing between the inlet end 9 and outlet end 5 of each helical tube 8 is 180 degrees) with a height H of 10.14 mm (corresponding to an angle of elevation of approximately 8.64 degrees). The primary bounding condition on the minimum pitch is the thickness of the bulk material of the diffuser body 10 between tubes; the material and manufacturing process will set this constraint, as will the number of tubes.

Figure 3:
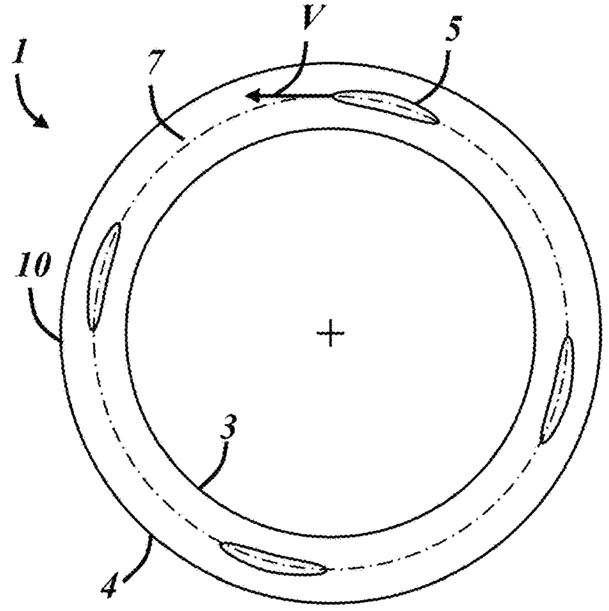
FIG. 3 is a top view of the first embodiment.
Figure 4:
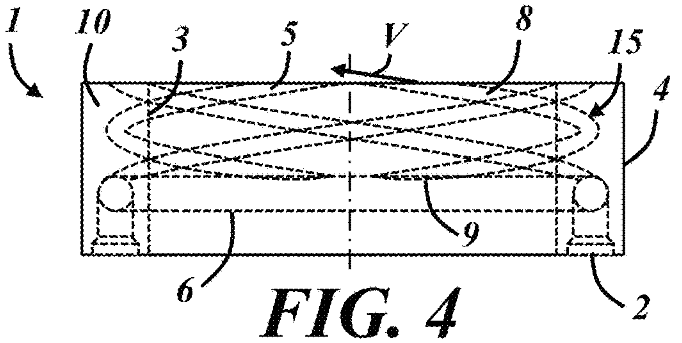
FIG. 4 is a side view of the first embodiment.
Figure 5:
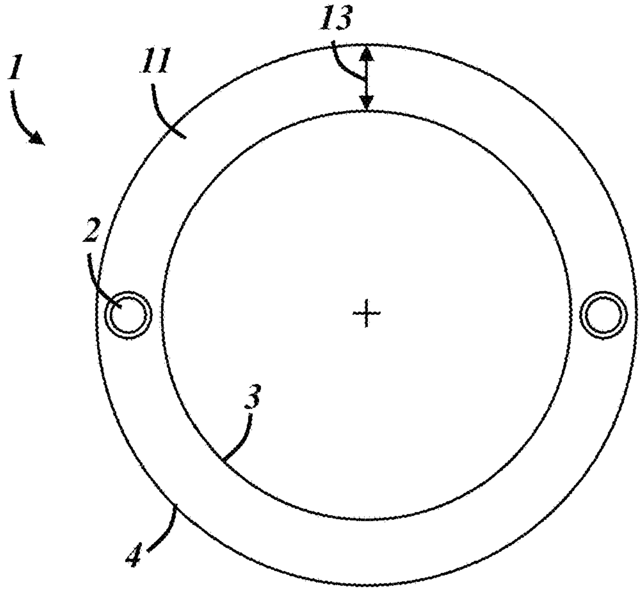
FIG. 5 is a bottom view of the first embodiment.

FIG. 3 provides a top view of the diffuser 1 and shows the axial end face of the outlet end 7 of the diffuser body 10. The inner wall 3 and the outer wall 4 of the diffuser 1 are marked accordingly. The first embodiment features two inlet holes 2 (FIG. 5) and four azimuthally spaced outlet holes defined at the outlet ends 5 of the helical tubes 8. An example of the above-referenced tangential velocity V with which propellant is ejected into the annular cavity of a Hall effect thruster system is also depicted in FIG. 3. FIG. 4 depicts a side view of the diffuser 1 with the hollow internal flow geometry 15 denoted by dotted lines. The inlet holes 2 are visible between the inner and outer walls 3, 4 of the diffuser towards the sides of the diagram. The toroidal plenum 6 visibly connects with the inlet holes 2 and is depicted as a rectangle in this view because it wraps azimuthally around the entire diffuser 1. Above the plenum 6 the helical tubes 8 begin at inlet ends 9, coiling helically upwards through the diffuser body 10 to the top face and outlet ends 5. All of these features of the hollow internal flow geometry 15 are defined within the bulk material of the diffuser body 10, which is constrained by the axial end faces of the inlet and outlet ends 11, 7 and also by the inner and outer walls, 3 and 4 respectively. The tangential velocity V illustrated in FIG. 3 is also depicted in FIG. 4, showing that the velocity V has an axial component as well. FIG. 5 depicts a bottom view of the diffuser 1 and shows the axial end face of the inlet end 11 and radial thickness 13 of the diffuser. The inlet holes 2 are visible on the bottom surface and evenly spaced azimuthally in the first embodiment. This embodiment is particularly well-suited for use with a gaseous propellant.

Figure 6A:
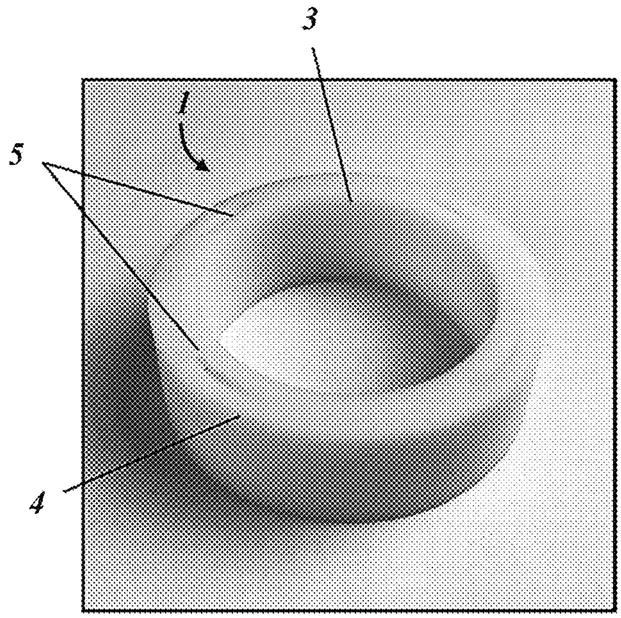
FIG. 6A is a photograph of the outlet end of a first prototype of the first embodiment.
Figure 6B:
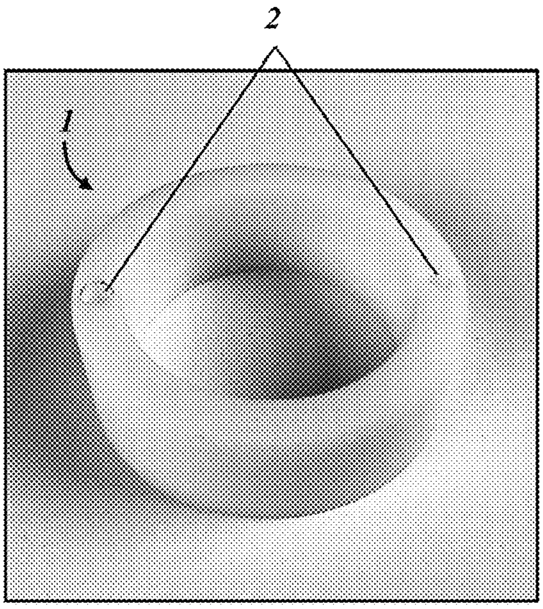
FIG. 6B is a photograph of the inlet end of the first prototype of the first embodiment.
Figure 7A:
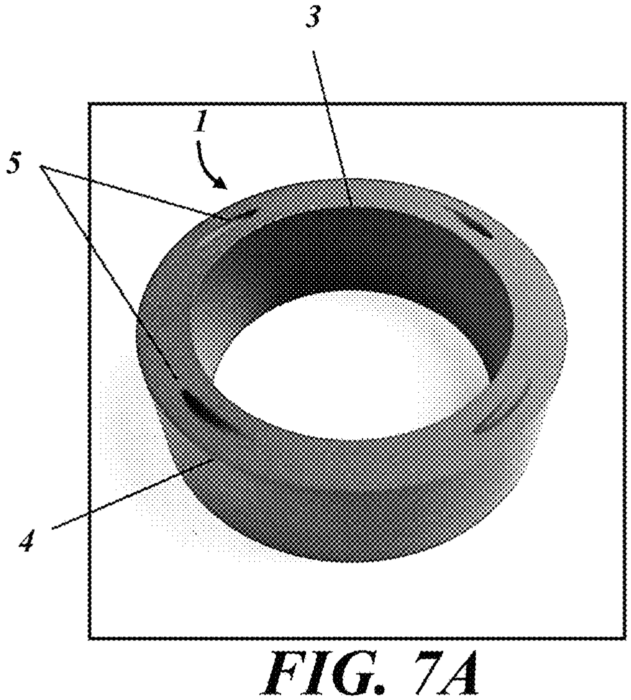
FIG. 7A is a photograph of the outlet end of a second prototype of the first embodiment.
Figure 7B:
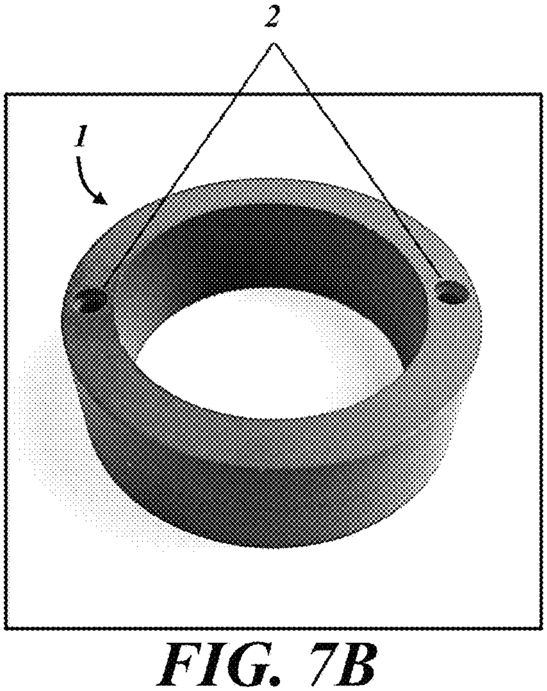
FIG. 7B is a photograph of the inlet end of the second prototype of the first embodiment.

The helical tubes 8 and the toroidal plenum 6 are hollow cavities of the hollow internal flow geometry 15 fully defined within the bulk material of the diffuser body 10 and thus are very difficult to manufacture with traditional subtractive manufacturing techniques. Additive manufacturing, however, may be used to manufacture the diffuser 1 by building up the bulk material of the diffuser body 10 around the requisite hollow features, enabling the manufacture of geometries impossible by traditional subtractive manufacturing techniques. Images of two versions of the first embodiment—each produced via additive manufacturing—are depicted in FIGS. 6A, 6B, 7A and 7B. FIGS. 6A-6B depict the first version of the first embodiment in a top view (FIG. 6A) and bottom view (FIG. 6B). This version was manufactured via stereolithography (SLA). SLA manufacturing is a photochemical-based process in which light is used to cause liquid chemical monomers (or prepolymers) to harden into solid polymers. FIGS. 7A and 7B depict the second version of the first embodiment in a top view (subfigure 7A) and bottom view (subfigure 7B). This prototype was manufactured additively using selective laser melting (SLM). SLM is a sintering based process in which a laser is used to heat powder to a temperature where the material particles are able to melt and fuse together. The version depicted in FIGS. 7A and 7B was manufactured by laser sintering an aluminum alloy and then was subjected to sulfuric anodization to generate an electrically insulative oxide layer on the surface. Other potential post-treatments after additive manufacturing include, but are not limited to, conversion coating, galvanization, electroplating, powder coating, heat treatment, glazing, thermoplastic coating and thermoset coating. Other potential techniques that may be used to manufacture this diffuser include, but are not limited to, vat polymerisation (including SLA), material jetting, binder jetting, material extrusion (including additive welding), powder bed fusion (including SLM), sheet lamination, directed energy deposition, and injection molding with post-processing fusion. Materials that may be used to manufacture this diffuser include, but are not limited to graphite, metal (including aluminum, iron, steel, Inconel, Hastelloy, titanium, tantalum, and molybdenum), ceramic (including boron nitride) and polymers, including thermoplastic, and/or thermoset materials, including thermoplastic elastomers.

Figure 8:
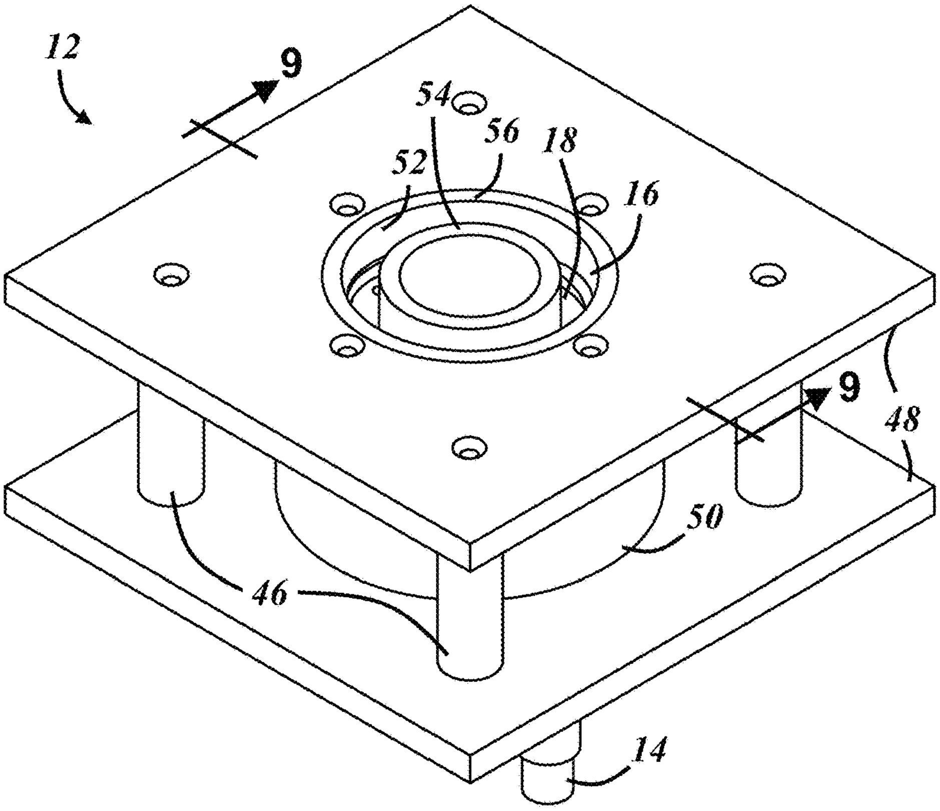
FIG. 8 is an isometric view of a Hall effect thruster system containing the first embodiment.

FIG. 8 depicts an assembled electric propulsion engine (specifically, a Hall effect thruster) system 12 containing the first embodiment of the diffuser 1. The system 12 shown is comprised of a plurality of electromagnets 46, a magnetic shunt 48, spacing component 50, a thruster body 52 with inner and outer walls 54, 56 defining a Hall thruster channel 16, inlet flow tubes 14, a diffuser constraining assembly 17 (FIG. 9), and a thruster anode 18. The diffuser 1 sits inside the Hall thruster channel 16 of the thruster body 52 underneath the axial constraining assembly 17 and thruster anode 18. FIG. 9 depicts a cross-sectional view of the assembled system 12, with the first embodiment of the diffuser 1 visible. In the first embodiment, two propellant feed tubes 14 extend through the back (i.e., bottom) of the thruster channel 16 into the diffuser inlet holes 2. The system 12 is configured to constrain both the radial and rotational motion of the diffuser 1 inside the depicted channel 16. The diffuser 1 is axially constrained on the inlet end 11 by the thruster channel 16, on the outlet end 7 by the constraining assembly 17 and thruster anode 18, and rotationally by the propellant tubes 14. In this manner, no fasteners were used to constrain the diffuser 1 within the Hall thruster channel 16 or system 12, but additional embodiments of the diffuser may require fasteners.

Figure 10:
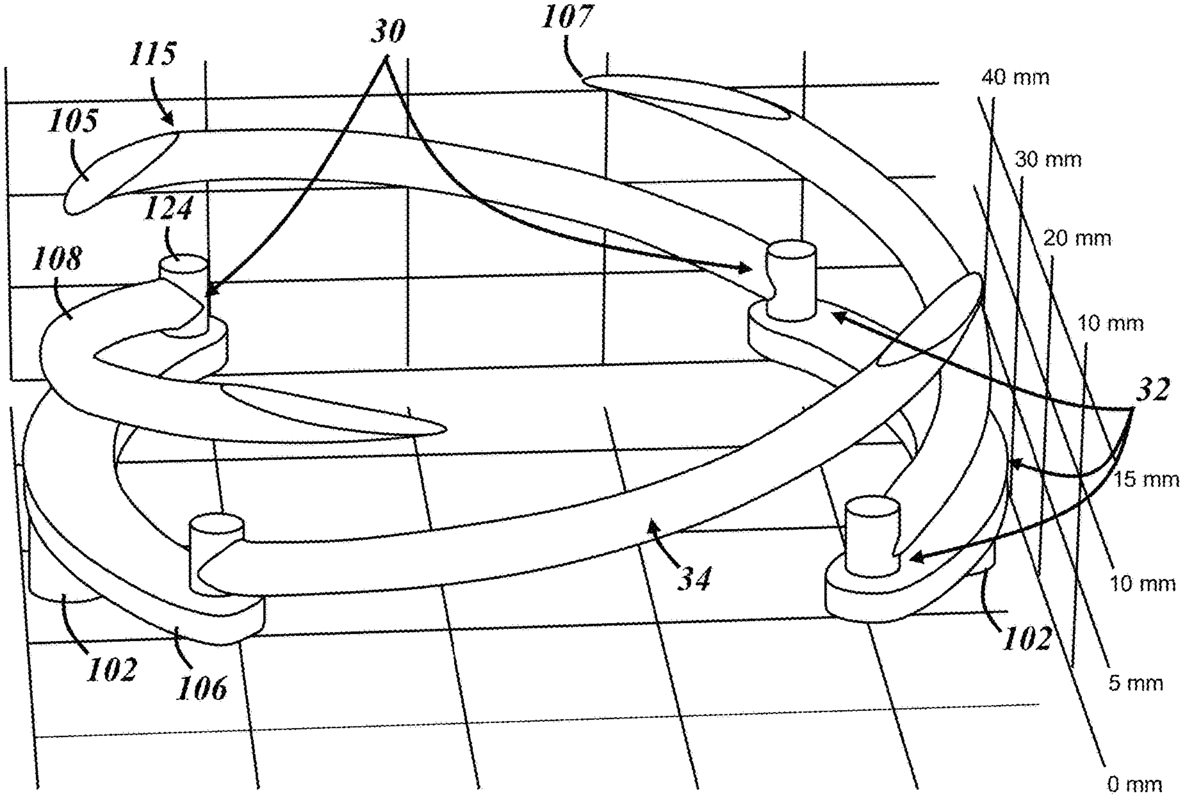
FIG. 10 depicts the hollow internal flow geometry of a second embodiment.

FIG. 10 depicts the hollow internal flow geometry 115 of a second embodiment of the diffuser and pressure regions of a gaseous propellant flowing through it. This embodiment contains two inlet holes 102, each of which opens into a plenum 106 having a rectangular cross-section revolved part way around the main axis of the diffuser. At either end of each plenum 106 is an axially extending cylindrical cavity 124 which extends towards the outlet end 107 of the diffuser. Each cylindrical cavity 124 serves as a fluid connector between the plenums 106 and each of a plurality of helical tubes 108 that revolve around the main axis of the diffuser while extending towards their respective outlet ends 105 at the outlet end 107 of the diffuser. These helical tubes 108 intersect the top plane of the diffuser body to form outlet holes at their outlet ends 105 through which propellant can exit the diffuser. All of these features (102, 106, 108, 124) are cavities defining the hollow internal flow geometry 15 of the diffuser which are constrained by the bulk material of the diffuser body and, as such, form a set of fluidly connected paths through which propellant can flow from the inlet holes 102 to the outlet holes 105. Functionally, features 102, 106, 108, 105 in the second embodiment serve the same roles as features 2, 6, 8, and 5 in the first embodiment, respectively. In this figure, based on a simulation of inlet flow, regions of low pressure 30, regions of high pressure 32, and flow trajectories 34 were identified to confirm that pressure gradients and azimuthal trajectories successfully form within the diffuser cavities.

In embodiments, the diffuser has about 2-500, or about 2-250, or about 4-125 outlet openings 5, 105 to provide for more even distribution of propellant. The diffuser may have about 1-10, or about 1-4 inlet openings 2, 102.

The radial thickness 13 (FIG. 5) may fall within the range of about 0.1-100 cm. Small thrusters typically have a radial thickness of about 0.2-10 cm, or about 0.5-5 cm, or about 1-2 cm. Large thrusters typically have a radial thickness of about 1-50 cm, or about 2-20 cm, or about 3-10 cm. The diameter D of the outer wall 4 may fall within the range of about 1-500 cm. Small thrusters typically have an outer wall diameter D of about 2-100 cm, or about 3-50 cm, or about 3-15 cm. Large thrusters typically have an outer wall diameter D of about 10-150 cm, or about 10-100 cm, or about 12-50 cm. The distance between the outlet end 7 and inlet end 11 faces may fall within the range about 0.5-50 cm, or about 0.75-10 cm, or about 1-5 cm. In embodiments, the cross section of the plenum 6, 106 is circular, oblong, elliptical, rectangular, or has another polygonal shape.

In embodiments, the angle of elevation of the helical channels 8, 108 is in the range of about 2-60 degrees, or about 5-30 degrees, or about 8-13 degrees. In some cases, the diameters of the helical channels range from about 0.1 mm to about 10 cm, or about 1 mm to about 1 cm. In embodiments the cross section of the helical channels is circular, oblong, elliptical, rectangular, or has another polygonal shape.

One method of making the diffuser is by additive manufacturing. The dimensions of the channels and openings in the diffuser are selected based on the properties of the materials and manufacturing process used. Minimum feature size and wall thickness are two driving parameters of diffuser feature dimensions. These parameters are reported by individual manufacturers for materials and manufacturing techniques they use. In the embodiment shown in FIG. 1, for a ceramic diffuser, a minimum wall thickness of 0.889 mm was used, a plenum diameter of 3 mm was used, and helical channels of diameter 1.5 mm were used. In some cases, for a ceramic diffuser used in combination with a gaseous propellant, the minimal wall thickness may be in the range of about 0.7 to about 5 mm, or about to about 2 mm, the plenum diameter may be in the range of about 2 mm to about 6 mm, or about 3 to about 4 mm, and the diameter of the helical channels may be about 0.3 mm to about 2.5 mm, or about 1 mm to about 2 mm. These parameters are not limiting.

While the illustrated diffuser is a unitary component, i.e. it is manufactured as a single, one-piece component, the diffuser alternatively can be made by forming sub-components which are fused, fastened, clamped, or otherwise attached together.

Example 1

Figure 11:
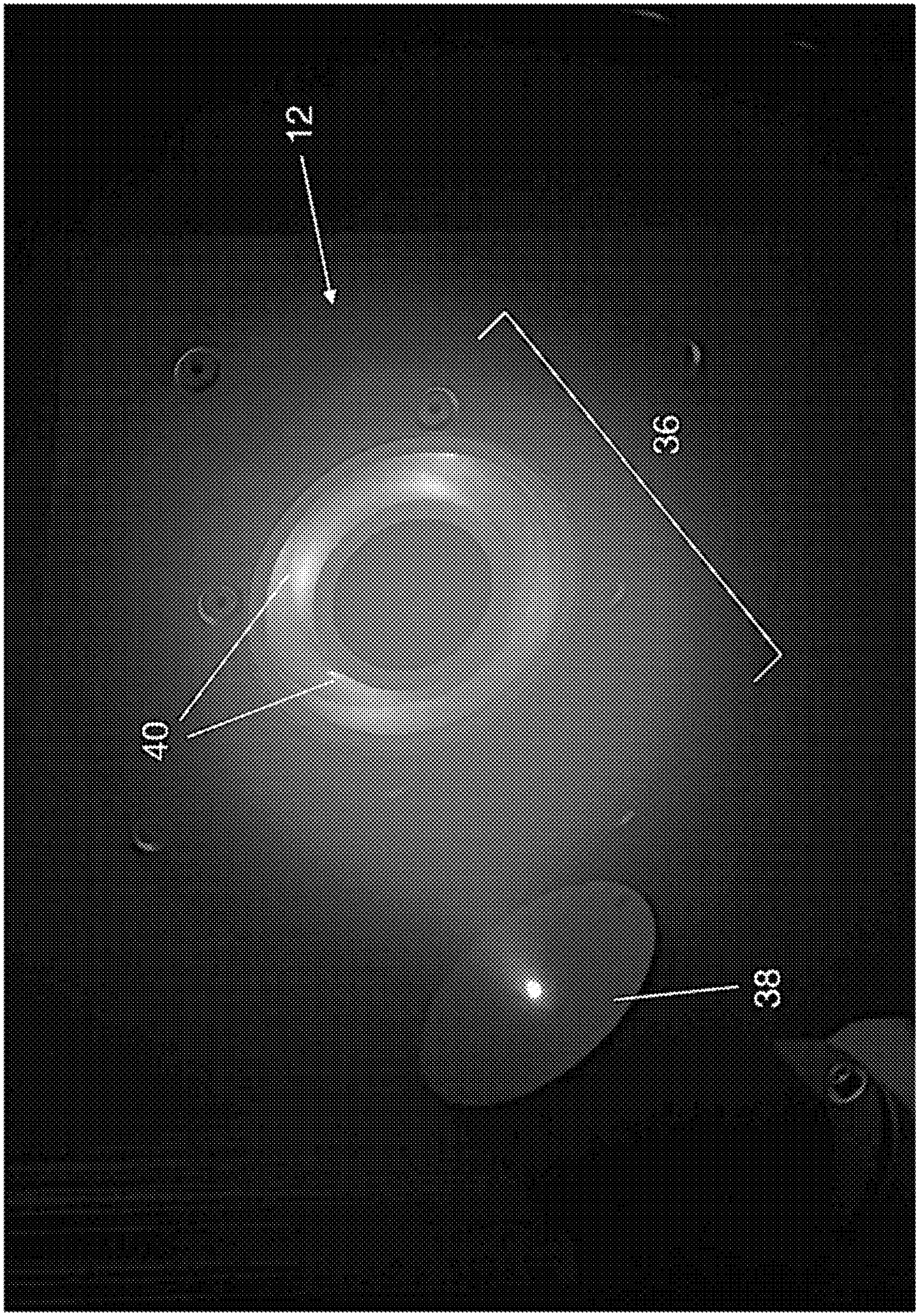
FIG. 11 is a photograph that shows the first embodiment used during a live-fire test of the system depicted in FIGS. 8 and 9.

FIG. 11 is a photograph of the first embodiment being used during a live fire test of the system depicted in FIGS. 8 and 9. In this photograph a plasma discharge 36 sustained by a hollow cathode 38 can be seen emanating from the Hall effect thruster system 12 containing the first embodiment of the diffuser. Regions of higher plasma density (for example, 40) are brighter white in this figure. The regions of visually highest plasma density correspond to the exit holes of the diffuser, suggesting successful control over propellant injection trajectory.

Testing was performed at the MIT Space Propulsion Laboratory. During testing, the thruster system shown in FIG. 11 was affixed to a low-friction hanging pendulum in contact with a piezoresistive strain gauge configured within a Wheatstone bridge differential-voltage measurement circuit. During testing, thrust generation would press the pendulum against the gauge, causing a change in the Wheatstone bridge's differential-voltage that was measured by an analog-to-digital converter built into a microcontroller. Testing was performed with krypton gas propellant and the peak power achieved during testing was 200 W. Due to poor calibration and unexpected floating voltages within the sensor circuit, the thrust data collected was unable to be used to characterize the thruster. However, the operational voltages, currents, and propellant flow rates enabled upper bounds of thruster parameters to be calculated. At 60 W of operation the maximum thrust produced could be 10 mN, with a specific impulse of up to 1091 seconds. These parameters fall within expected orders of magnitudes for thrusters of similar scales, such as the SPT-50.

Figure 12:
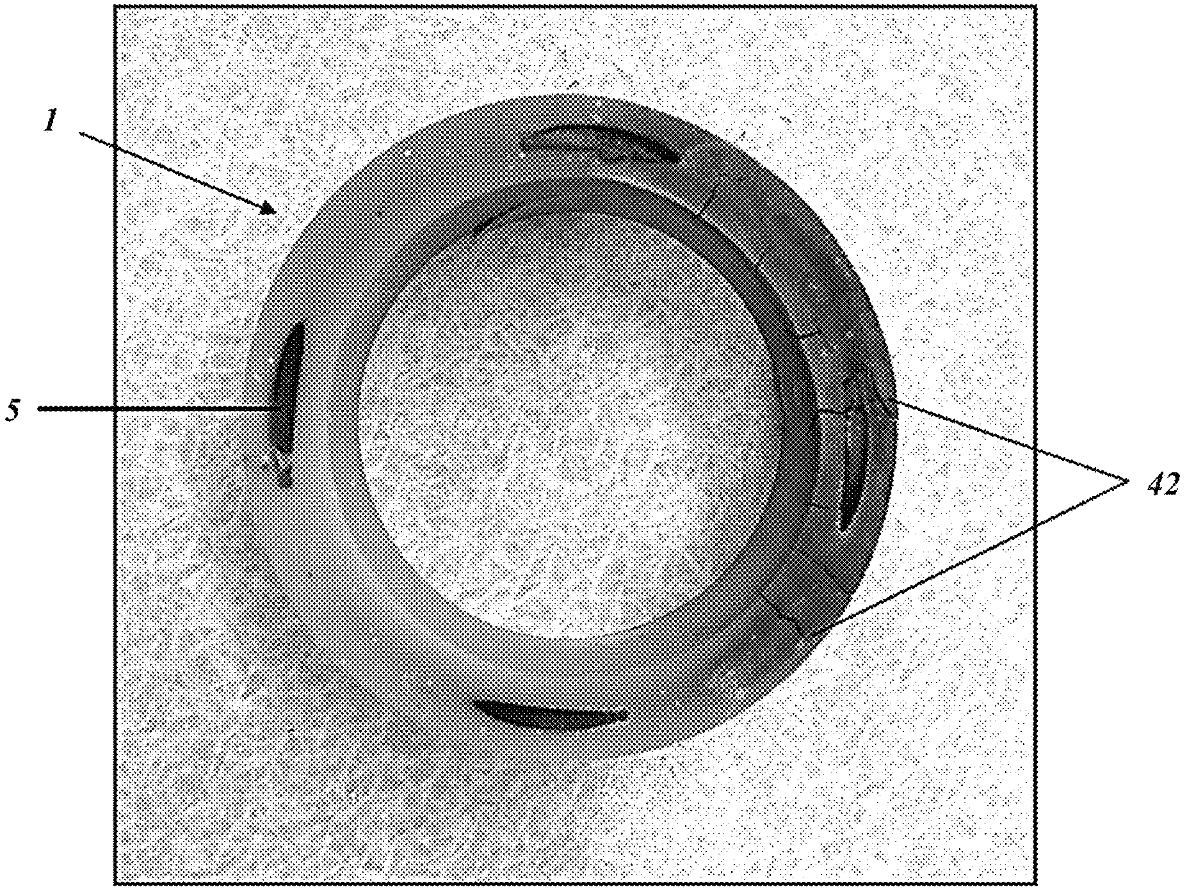
FIG. 12 is a photograph that shows the first embodiment following the live-fire test depicted in FIG. 11.

FIG. 12 is a photograph of the first embodiment after being removed from the Hall effect thruster system 12 following the test depicted in FIG. 11. In this photograph the diffuser 1 is seen to have discoloration on its surface due to exposure to high temperatures. This discoloration is especially prominent in the exit holes 5. Additionally, stress fractures 42 likely due to thermal expansion from excessive contact with the channel walls are distinctly isolated to one side of the diffuser. Discoloration and stress fracturing will likely not be present for diffusers made from a different material, nonlimiting examples of which include aluminum, steel, and Hastelloy.

Example 2

Figure 13:
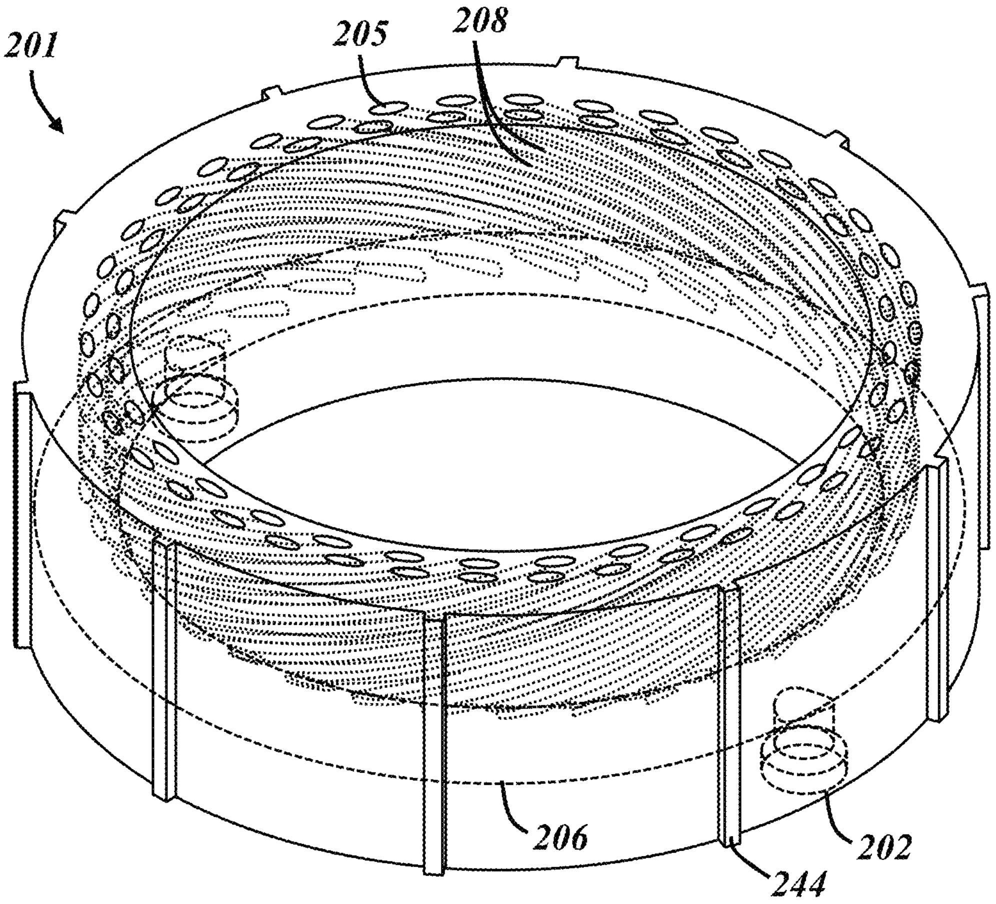
FIG. 13 is an isometric view of a third embodiment.

FIG. 13 depicts a third embodiment of a diffuser 201 which is similar to the first embodiment in that it was made of the same stereolithographic resin and contained a single toroidal plenum 206 and two inlet holes 202 but contains the addition of a plurality of ribs 244 around the outside wall of the diffuser and contains ninety outlet holes 205, to create more equal propellant distribution. The helical channels 208 in this embodiment have an angle of elevation of approximately 12.43 degrees. The ribs 244 were used to reduce thermal contact and therefore reduce the discoloration and stress fracturing seen in FIG. 12. This prototype was manufactured in order to perform live-fire and other thermal testing to evaluate the effectiveness of external ribs in reducing heat transport between the diffuser 201 and its surrounding channel walls 16. This test was successful in that ignition was achieved, a more equal propellant distribution was achieved, and stress fracturing did not occur.

Example 3

Figure 14:
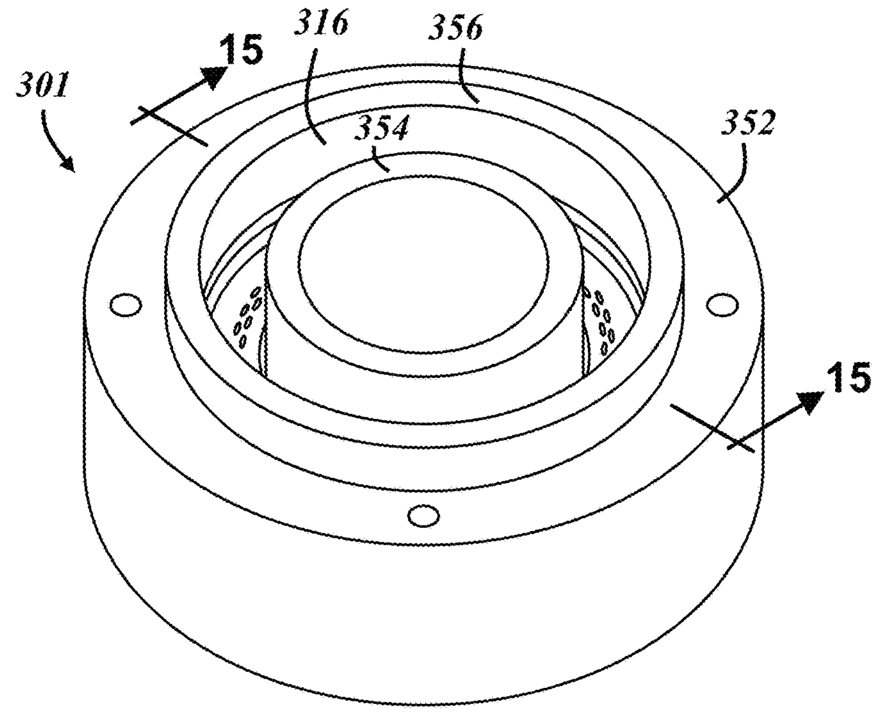
FIG. 14 is an isometric view of a fourth embodiment.
Figure 15:
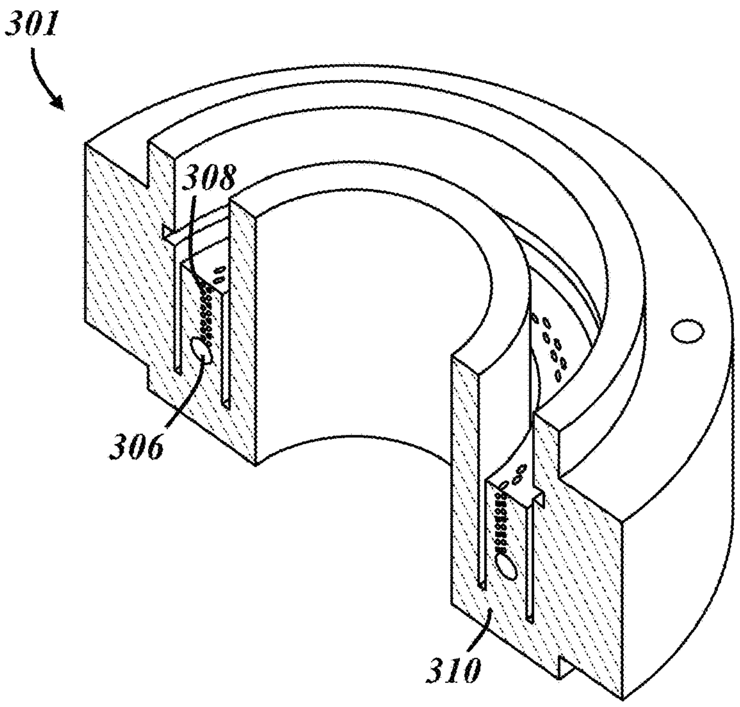
FIG. 15 is a sectional isometric view of the fourth embodiment.

FIG. 14 depicts a fourth embodiment of a diffuser 301 in which the diffuser 301 and inner and outer walls 354, 356 defining the channel 316 of a Hall thruster system are 3D printed as a single part, sharing the same bulk material body 310. The diffuser 301 of FIG. 14 is made in the shape of the thruster body 52 of FIG. 9 and therefore can alternatively be considered as a thruster body 352 of a Hall thruster system that includes a Hall thruster channel 316 and a diffuser 301 formed as a single piece at the bottom of the channel 316. FIG. 15 depicts a section view of the fourth embodiment in which a toroidal plenum 306 and plurality of helical channels 308 are defined within the unibody diffuser-channel component 352. This embodiment was manufactured out of a stereolithographic epoxy resin in order to enable live-fire and other thermal testing to evaluate the effectiveness of stereolithographic epoxy resin as a Hall thruster channel wall material and the behavior of heat transport through the bulk material of a unified channel-diffuser component.

Example 4

FIG. 10 depicts the hollow flow geometry 115 of the second embodiment of the diffuser, in which two separate, rectangular-cross-section plenums 106 were used, rather than a single toroidal plenum. A simulation was run to investigate the trajectories and pressure gradients that may arise as an effect of having multiple, disconnected plenums, rather than plenums that fully circumnavigate the diffuser. It was found that diffusion occurred.

Prophetic Example 5

A diffuser similar to the diffuser in Example 1 is created in which notches or other cutouts are made along the outer or inner walls of the diffuser to allow for the routing of electrical cables. This is done to allow the routing of power connections to the thruster anode, central electromagnet, and/or hollow cathode. These notches or cutouts do not impact performance.

Prophetic Example 6

Diffusers similar to that of Example 1 are formed, but with an increased number of outlet holes. In one case, 50 outlet holes are used to increase even distribution of propellant. In the other case, 100 outlet holes are added to increase even distribution of propellant.

Prophetic Example 7

A diffuser similar to that of Example 1 is formed, but in which multiple stages of plenums stacked in the axial direction are included to control the pressure gradient within the diffuser. This is done to equalize pressures throughout the diffuser, further improving equal propellant distribution.

Prophetic Example 8

A diffuser similar to that of Example 1 is formed, but for which the radial thickness 13 of the diffuser is increased. This is done to increase surface contact between the diffuser and channel walls, increasing heat transport between the two surfaces and could be advantageous in conducting heat away from the diffuser.

Prophetic Example 9

A diffuser similar to that of Example 1 is formed, in which the radial thickness 13 of the diffuser is decreased. This is done to decrease surface contact between the diffuser and channel walls, reducing heat transport between the two surfaces. This can be advantageous in preventing excessive heat from conducting into the diffuser. This also can be done to enable the inclusion of additional components.

Prophetic Example 10

Diffusers similar to that of Example 2 are formed, but in which ribs are placed along the inner and/or outer walls of the diffuser. In one case, helical ribs are used. In another case, circumferential ribs are used. The ribs are included to reduce thermal conduction between the diffuser and the surrounding components. This also can be done to create cavities within which other components can be placed or to create geometries that allow for novel constraining features.

Prophetic Example 11

A diffuser similar to that of Example 2 is formed, but in which the radial width of the diffuser is reduced and the propellant outlet holes are distributed around the outer wall of the diffuser, rather than the top wall surface, so that propellant is distributed into the gap between the outer wall of the diffuser and the thruster channel wall. This is done to enable inclusion of a thruster anode that sits directly on the top surface of the diffuser and would cover outlet holes that might otherwise be placed on that surface.

Prophetic Example 12

A diffuser similar to that of Example 3 is formed in which the diffuser and thruster channel walls are manufactured as a single component, but the propellant outlet holes are distributed around the outer side wall of the thruster channel, as opposed to the bottom surface of the thruster channel, which corresponds to the top surface of the diffuser. This geometry is enabled by the diffuser and thruster channel walls being manufactured as a single component and is done to enable inclusion of an anode that sits directly on the top surface of the diffuser and would cover outlet holes that might otherwise be placed on that surface.

Prophetic Example 13

A diffuser similar to that of Example 1 is formed, but in which the top and/or bottom side walls of the diffuser are not flat plane surfaces. Convex or concave shapes may be used to accommodate anodes of greater surface area than a plane and to enable more complex propellant injection geometries.

Prophetic Example 14

A diffuser similar to that of Example 1 is formed in which the shape of the outer wall of the diffuser is not round or cylindrical. Diffusers using polyhedral or other closed shape geometries may be used in Hall thrusters of non-standard shapes, such as "racetrack" thrusters, or as a component within other electric propulsion systems besides Hall thrusters.

Prophetic Example 15

A diffuser similar to any of the aforementioned examples is formed, but in which the diffuser is manufactured out of more than one part and these parts are fused, fastened, clamped, or otherwise attached together to form a complete diffuser. This assembly process may be used in order to create diffusers with subtractive manufacturing techniques that would otherwise prevent a single-body diffuser from being manufactured.

A number of alternatives, modifications, variations, or improvements therein may be subsequently made by those skilled in the art, which are also intended to be encompassed by the following claims.

The invention claimed is:

1. A Hall effect thruster system comprising an annular thruster channel and a diffuser that has helical propellant flow channels and is configured to eject ionizable propellant into the annular thruster channel in directions tangent to the helical channels, wherein the helical propellant flow channels share a common helical axis, and wherein each direction in which the propellant is ejected into the annular thruster channel has a component in the same rotational direction.

2. The system of claim 1, wherein the diffuser is configured to receive distinct portions of the propellant in each of the helical channels and eject each distinct portion of propellant into the annular thruster channel in a direction tangent to the respective helical channel.

3. The system of claim 1, wherein the diffuser comprises a solid diffuser body and a hollow internal flow geometry defined within the diffuser body and extending from an inlet end of the diffuser body, at which the propellant is received by the diffuser, to an outlet end of the diffuser body, at which the propellant is ejected into the annular thruster channel, and wherein the hollow internal flow geometry includes the helical channels and at least one other cavity.

4. The system of claim 3, wherein each cavity of the at least one other cavity is located between the inlet end of the diffuser and inlet ends of the helical channels.

5. The system of claim 3, wherein the at least one other cavity includes a propellant interface at the inlet end of the diffuser body and a plenum that receives propellant from the propellant interface and distributes the received propellant among the helical channels, and wherein each helical channel has an outlet end at the outlet end of the diffuser body.

6. The system of claim 1, wherein each helical channel has an inlet end that receives the propellant and an outlet end from which the propellant is ejected directly into the annular thruster channel.

7. The system of claim 1, wherein the diffuser includes a plenum that receives the propellant from an inlet end of the diffuser and distributes the received propellant among the helical channels.

8. The system of claim 7, wherein the plenum is defined by at least a portion of a toroid.

9. The system of claim 7, wherein the plenum is one of a plurality of plenums, each plenum receiving the propellant from the inlet end of the diffuser and distributing the received propellant among a respective plurality of the helical channels.

10. The system of claim 1, wherein the diffuser is a unitary component and is located in the annular channel.

11. The system of claim 10, wherein the unitary component further comprises a thruster body that includes the annular channel and is formed as a single piece with the diffuser.

12. The system of claim 1, wherein the diffuser is located in the annular channel and the system further comprises ribs extending between an inner or outer wall of the diffuser and a respective inner or outer wall defining the annular channel.

13. The system of claim 1, wherein the common helical axis is a central axis of the diffuser.

14. The system of claim 1, wherein an angle of elevation of each helical propellant flow channel is in a range from 2 to 60 degrees with respect to a radially extending plane.

15. The system of claim 14, wherein the range is from 5 to 30 degrees.

16. The system of claim 15, wherein the range is from 8 to 13 degrees.

17. A Hall effect thruster system comprising an annular thruster channel and a diffuser that has helical propellant flow channels and is configured to eject ionizable propellant into the annular thruster channel in directions tangent to the helical channels, wherein each helical propellant flow channel extends 50% to 100% of one helical turn between respective inlet and outlet ends.

18. The system of claim 17, wherein the directions in which the propellant is ejected into the annular thruster channel each have a component in the same rotational direction.

19. The system of claim 17, wherein an angle of elevation of each helical propellant flow channel is in a range from 2 to 60 degrees with respect to a radially extending plane.

* * * * *